United States Patent [19]

Zun

[11] Patent Number: 4,913,452
[45] Date of Patent: Apr. 3, 1990

[54] CASTER-SUPPORTING DEVICE FOR A BABY STROLLER

[76] Inventor: Hong-Fu Zun, No. 59, Alley 85, Lane 673, Chung Chen Road,Yi-Village, Jen Te Hsian, Tainan Hsien, Taiwan

[21] Appl. No.: 361,216

[22] Filed: Jun. 5, 1989

[51] Int. Cl.⁴ .............................................. B62B 7/00
[52] U.S. Cl. ................................. 280/47.41; 16/30; 16/35 R; 16/44; 280/47.38
[58] Field of Search ................. 280/47.38, 47.41, 658, 280/650; 16/35 R, 44, 30; 188/11.12

[56] References Cited

U.S. PATENT DOCUMENTS

| | | | |
|---|---|---|---|
| 4,759,098 | 7/1988 | Ko | 280/47.38 |
| 4,847,945 | 7/1989 | Schwartz et al. | 280/47.38 |
| 4,854,008 | 8/1989 | Kuo | 16/30 |

Primary Examiner—David M. Mitchell
Assistant Examiner—Eric Culbreth
Attorney, Agent, or Firm—Ladas & Parry

[57] ABSTRACT

A caster-supporting device for a baby stroller includes a sleeving secured to a stroller body. A connector is inserted into the sleeving and is retained on the sleeving by engaging the window of the sleeving with the resilient retaining member of the connector. The retaining member may be pressed to disengage from the window so as to remove the connector from the sleeving. A rotating body has a fixed circular tube inserted into the annular groove of the connector and carries a caster axle which extends therethrough. A vertical pin extends through the circular tube into the connector. A sliding body can slide on the connector and has two arms which flank the connector. The arms have vertical slide slots in which a horizontal pin slides. The horizontal pin extends through the connector and the upper end portion of the vertical pin so as to retain both the rotating body and the sliding body on the connector. When the sliding body is moved to engage the opening of the connector and the locking hole of the rotating body with the spring-biased locking element of the sliding body, relative rotation between the rotating body and the connector is prevented. When the sliding body is moved to engage the positioning hole with the locking element, the rotating body is locked on the connector.

4 Claims, 7 Drawing Sheets

CASTER-SUPPORTING DEVICE FOR A BABY STROLLER

BACKGROUND OF THE INVENTION

This invention relates to a baby stroller, more particularly to a caster-supporting device for a baby stroller which can be easily assembled and dismantled.

Referring to FIG. 1, a conventional foldable baby stroller which usually includes four casters (A) riveted to the support columns (B) of the stroller body, suffers from the following disadvantages:

(1) When the casters (A) are damaged, it is difficult to replace them.
(2) When manufacturing the baby stroller, the riveting of the casters (A) to the support columns (B) incurs substantial labor costs.
(3) Although the baby stroller can be folded, the casters occupy more than a little space after the baby stroller is folded for transportation.

SUMMARY OF THE INVENTION

It is therefore the main object of this invention to provide a caster-supporting device for a baby stroller which can be easily assembled and dismantled.

According to this invention, a caster-supporting device for a baby stroller includes a sleeving secured to a stroller body. A connector is inserted into the sleeving and is retained on the sleeving by engaging the window of the sleeving with the resilient retaining member of the connector. The retaining member may be pressed to disengage from the window so as to remove the connector from the sleeving. A rotating body has a fixed circular tube inserted into the annular groove of the connector. A caster axle extends through the rotating body. A vertical pin extends through the circular tube into the connector. A sliding body can slide on the connector and has two arms which flank the connector. The arms have vertical slide slots in which a horizontal pin slides. The horizontal pin extends through the connector and the upper end portion of the vertical pin so as to retain both the rotating body and the sliding body on the connector. When the sliding body is moved to engage the opening of the connector and the locking hole of the rotating body with the spring-biased locking element of the sliding body, relative rotation between the rotating body and the connector is prevented. When the sliding body is moved to engage the positioning hole of the connector with the locking element, the rotating body is locked on the connector.

BRIEF DESCRIPTION OF THE DRAWINGS

Other features and advantages of this invention will become apparent from the following detailed description of a preferred embodiment of this invention, with reference to the accompanying drawings, in which.

DETAILED DESCRIPTION OF THE PREFERRED EMBODIMENT

Figure 1:
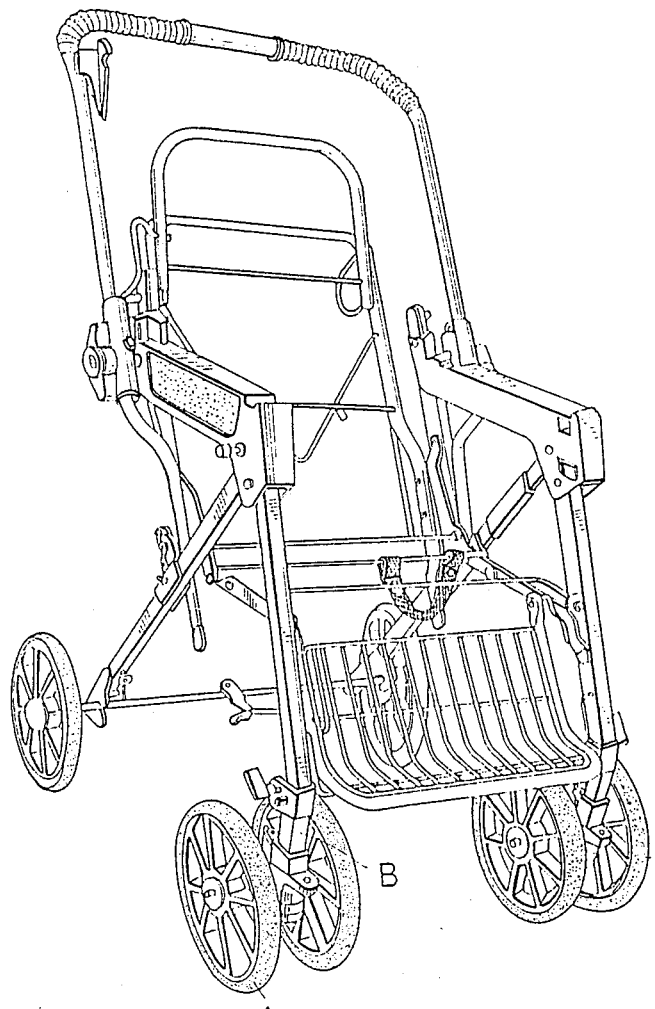
FIG. 1 is a perspective view of a conventional baby stroller.
Figure 2:
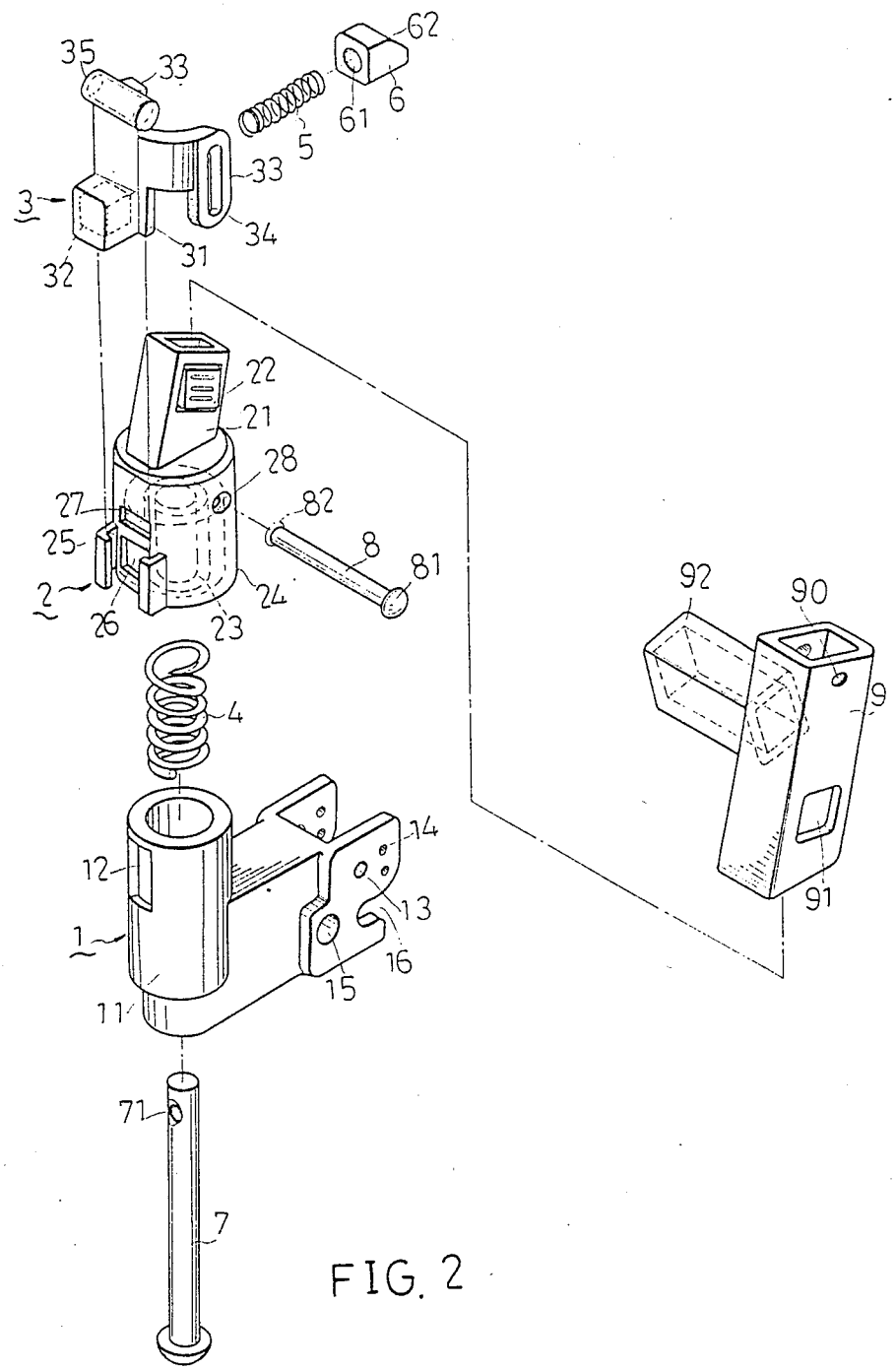
FIG. 2 is an exploded view of a caster-supporting device according to this invention.

Referring to FIGS. 2, 4, 6 and 8, a caster-supporting device for a baby stroller of this invention includes a rotating body 1, a connector 2, a sliding body 3, a large compression spring 4, a small compression spring 5, a locking element 6, a vertical pin 7, a horizontal pin 8 and a sleeving 9.

Figure 3:
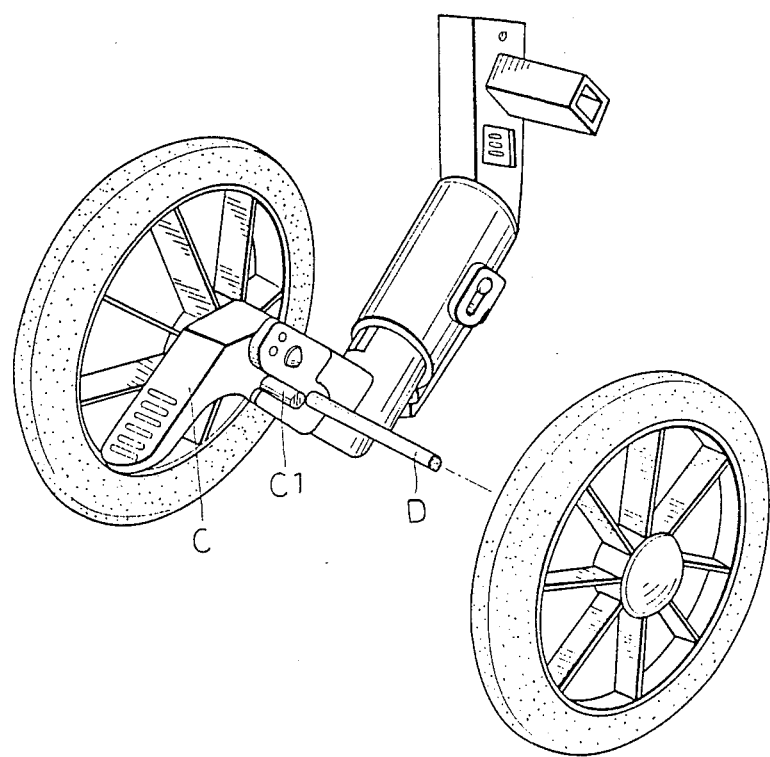
FIG. 3 is a partially exploded view showing a caster unit for a baby stroller including the caster-supporting device of this invention.

The rotating body 1 includes a fixed circular tube 11 which is inserted into an annular groove or circular tubular groove 20 of the connector 2. The groove 20 is defined by small and large circular tubes 23, 24 which are integrally formed with the connector 2. The large spring 4 is received within the circular tube 11 of the rotating body 1 and presses against the lower end of the small circular tube 23 of the connector 2. The circular tube 11 of the rotating body 1 has two aligned locking holes 12. A large rivet hole 13 and two small rivet holes 14 are formed through the rotating body 1 so as to connect pivotally a brake rod (C), (see FIG. 3). An axle hole 15 is formed through the rotating body 1 so that a caster axle (D) can extend therethrough. A notch 16 is also formed through the rotating body 1 for the insertion of the stop pin C1 (see FIG. 3) of the brake rod (C) therethrough. Because the structure of the brake mechanism is well-known in the art, more detailed description thereof is omitted.

Figure 4:
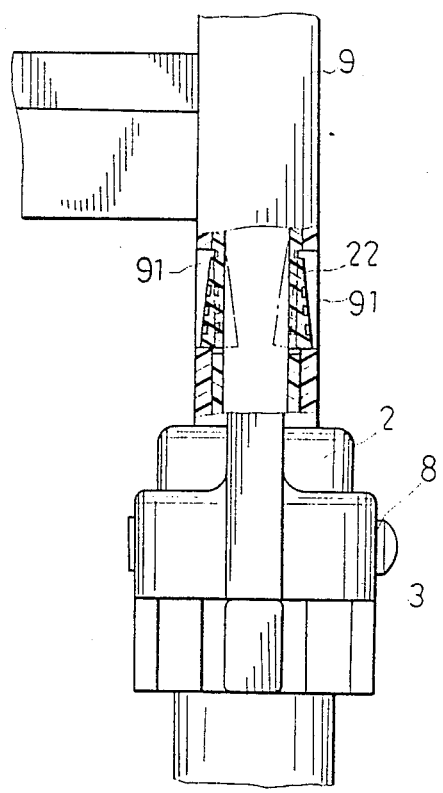
FIG. 4 is a schematic view illustrating how to interconnect the sleeving and the connector of the caster-supporting device in accordance with this invention.
Figure 5:
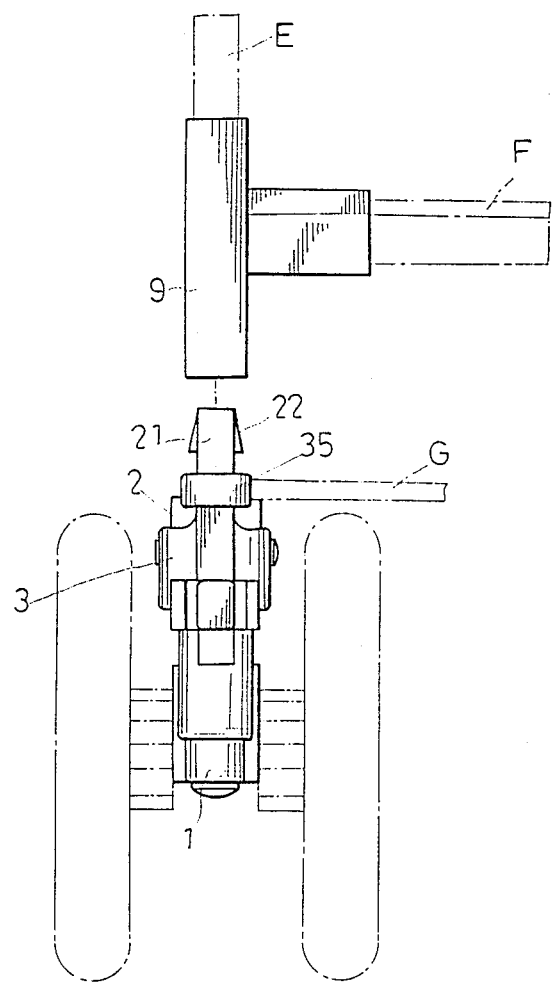
FIG. 5 is a schematic view illustrating how to remove a caster from a stroller body in accordance with this invention.

The connector 2 has a rectangular insertion portion 21 at the upper end thereof. The insertion portion 21 is inserted into the rectangular, tubular portion of the sleeving 9. As shown in FIG. 4, two resilient retaining members 22 are disposed on two opposite side walls of the insertion portion 21 and normally extend therefrom to engage with the windows 91 of the sleeving 9. Referring to FIG. 5, the retaining members 22 may be pressed to disengage from the windows 91 so as to remove the connector 2 from the sleeving 9. As a result, it is easy to disconnect the caster unit from the stroller body according to this invention. Two L-shaped plates 25 are fixed on the side wall of the connector 2 so as to define a slideway therebetween in which an opening 26 is formed through the side wall of the connector 2 in alignment with the locking holes 12 of the rotating body 1. The sliding body 3 includes a slide plate 31 secured thereto which is slidable between the two L-shaped plates 25. Above the opening 26, a positioning hole 27 is formed through the side wall of the connector 2.

The sliding body 3 includes two arms 33 flanking the connector 2 through which two slide slots 34 are formed. The vertical pin 7 extends through the large spring 4 in the circular tube 11 of the rotating body 1 and into the cylindrical hole defined by the small circular tube 23 of the connector 2 and has a pin hole 71 formed through the upper end portion thereof. The horizontal pin 8, which originally has only one head 81, extends through the slide slots 34 of the sliding body 3 and the pin holes 28 of the connector 2 and the pin hole 71 of the vertical pin 7 and is hammered to form a second head 82 so as to retain both the rotating body 1 and the sliding body 3 on the connector 2.

The slide plate 31 has an accommodating chamber 32 in which the locking element 6 is received. The locking element 6 has a cylindrical hole 61 and a sloped surface 62. The small spring 5 is accommodated within both the cylindrical hole 61 of the locking element 6 and the accommodating chamber 32 of the slide plate 31 so as to bias the locking element 6 to move out of the accommodating chamber 32. A circular, horizontal sleeve 35 is secured to the upper end of sliding body 3.

The sleeving 9 includes a rivet hole 90 adapted for riveting the sleeving 9 to the support column (E) (see FIG. 5) of a stroller body and a rectangular, horizontal sleeve 92. Referring to FIG. 5, a horizontal, rectangular connecting rod (F) can be inserted into the sleeves 92 of a pair of aligned front or rear caster units for a baby stroller so as to strengthen the support column (E).

It is understood that the large spring 4 can reduce the shock sustained by the stroller body.

Figure 8:
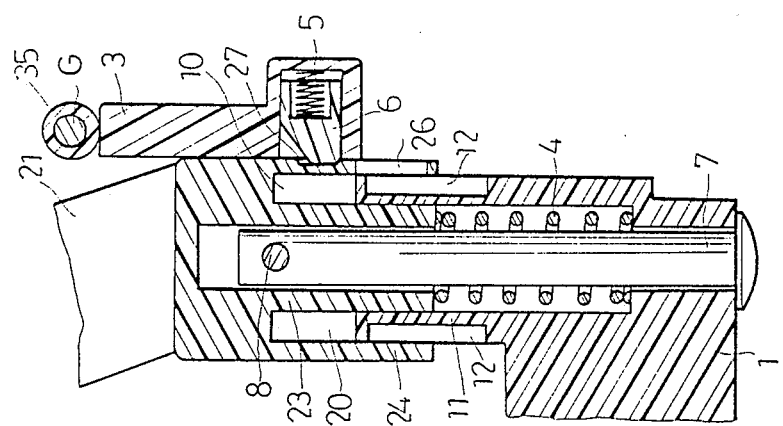
FIG. 8 is a schematic view illustrating how to unlock the rotating body from the connector of the caster-supporting device in accordance with this invention.

Referring to FIG. 8, the locking element 6 is normally engaged with the positioning hole 27 of the connector 2, thereby allowing for relative rotation between the rotating body 1 and the connector 2. At the same time, the caster which is mounted on the rotating body 1 can rotate in any direction.

Figure 6:
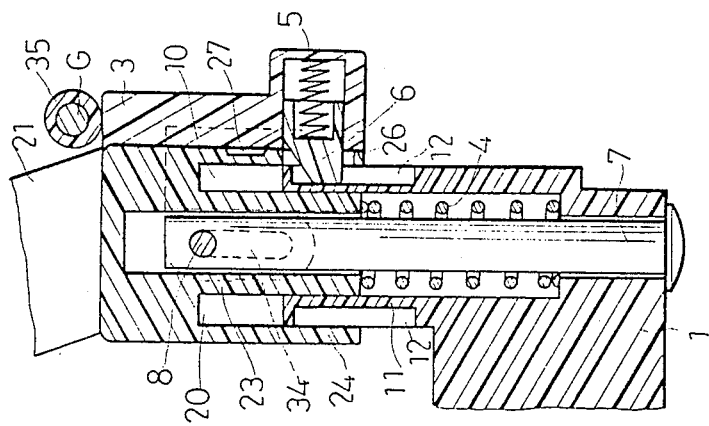
FIG. 6 is a schematic view illustrating how to lock a rotating body on the connector of the caster-supporting device in accordance with this invention.

Referring to FIG. 6, when the sliding body 3 is moved downward to engage both one locking hole 12 of the rotating body 1 and the opening 26 of the connector 2 with the locking element 6, the rotating body 1 is locked on the connector 2 to prevent relative rotation therebetween.

Figure 7:
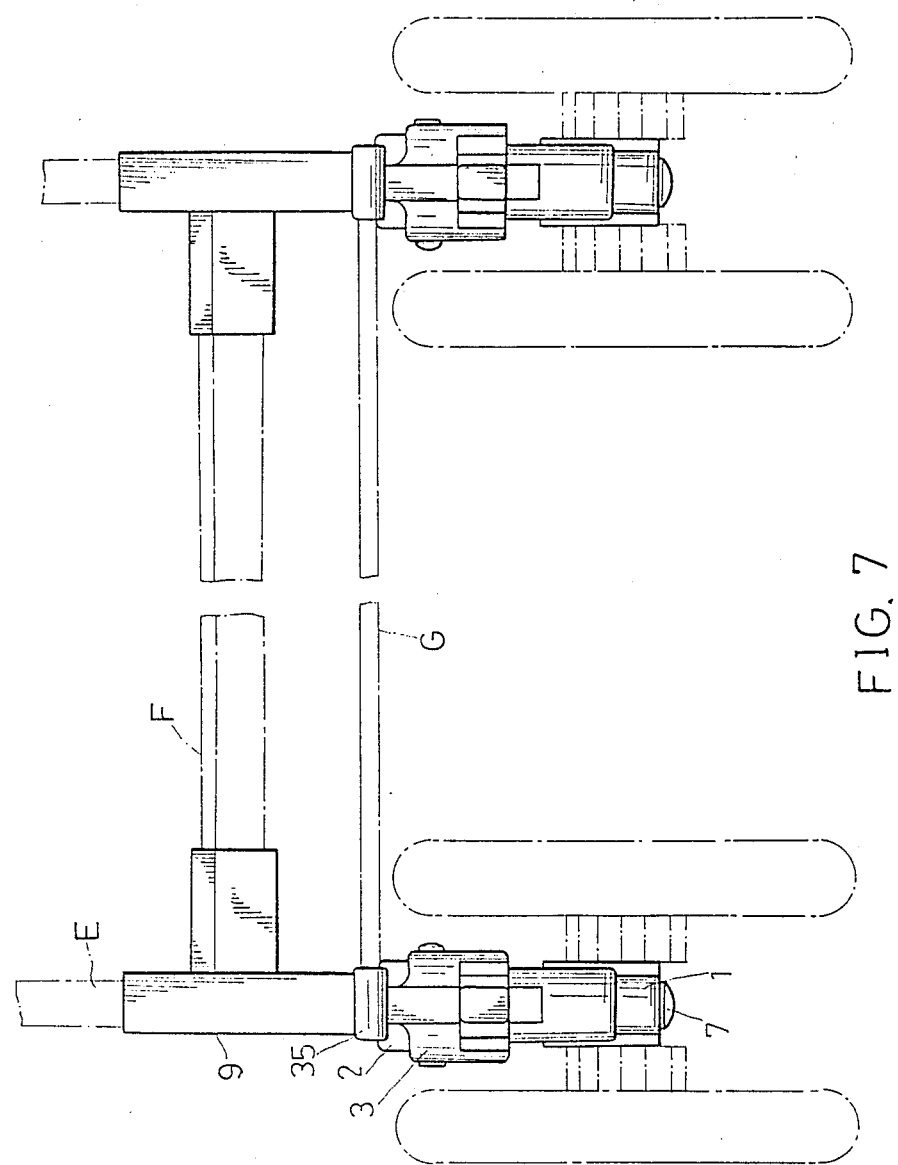
FIG. 7 is a schematic view illustrating how to synchronize the sliding bodies of two caster-supporting devices in accordance with this invention.

Referring to FIG. 7, a horizontal, circular connecting rod (B) may be inserted into the circular sleeves 35 of two aligned front or rear caster units so as to synchronize two sliding bodies 3.

With this invention thus explained, it is apparent that numerous modifications and variations can be made without departing from the scope and spirit of this invention. It is therefore intended that this invention be limited only as indicated in the appended claims.

I claim:

1. A baby stroller including a stroller body and a caster unit, said caster unit including a caster wheel, a caster axle, and a caster-supporting device for mounting said caster axle on said stroller body, said caster-supporting device comprising:

a rotating body provided for extension of said caster axle therethrough and including a fixed circular tube fixed thereon which is perpendicular to said caster axle and has two aligned locking holes formed through two opposed walls thereof;

a connector including an upper end insertion portion with a resilient retaining member disposed on an upper end portion thereof, a circular tubular groove formed in a lower end surface of said connector so as to engage with an upper end of said circular tube, a cylindrical hole formed in said lower end surface of said connector at center of said circular tubular groove, two pin holes formed through two opposite side walls of said connector in communication with an upper end portion of said cylindrical hole, a slideway formed in a side wall of said connector, an opening formed through a side wall of said connector in alignment with said locking holes of said rotating body, and a positioning hole formed through said side wall of said connector in communication with said slideway;

a sliding body including a slide plate secured thereto sliding within said slide slot in a direction parallel to said circular tube, a spring-biased locking element carried on said slide plate and engagable with one of said locking holes and said opening when said slide plate moves to a predetermined position, and two slide slots formed through said sliding body on two opposite sides of said connector, said locking element being normally engaged with said positioning hole, thereby allowing for relative rotation between said rotating body and said connector;

a sleeving secured to said stroller body and having a window formed in a wall thereof which is engaged with said retaining member so as to retain said insertion portion of said connector within said sleeving, said retaining member being capable of being pressed to disengage from said window;

a vertical pin extending, through said circular tube, into said cylindrical hole of said connector and having a pin hole formed transversely through an upper end portion thereof; and a horizontal pin extending through said slide slots of said sliding body, said pin holes of said connector and said pin hole of said vertical pin and having two diameter-increased heads formed on two ends thereof so as to retain said horizontal pin within said slide slots of said sliding body;

whereby, said sliding body can be moved relative to said connector so as to engage both said locking holes and said opening with said locking element, thereby interlocking said rotating body and said connector against relative rotation therebetween.

2. A caster-supporting device as claimed in claim 1, wherein said rotating body includes a resilient element interposed between said rotating body and said connector so as to push said rotating body away from said connector, thereby reducing shock sustained said baby stroller.

3. A baby stroller as claimed in claim 2, wherein said resilient element is a compression spring disposed within said circular tube of said rotating body and retained on said vertical pin.

4. A baby stroller including a stroller body, two aligned front caster units and two aligned rear caster units, each of said front and rear caster units including a caster wheel, a caster axle, and a caster-supporting device for mounting said caster axle on said stroller body, each of said caster-supporting devices comprising:

a rotating body provided for extension of a caster axle therethrough and including a fixed circular tube fixed thereon which is perpendicular to said caster axle and has two aligned locking holes formed through two opposed walls thereof;

a connector including an upper end insertion portion with a resilient retaining member disposed on an upper end portion thereof, a circular tubular groove formed in a lower end surface of said connector so as to engage with an upper end of said circular tube, a cylindrical hole formed in said lower end surface of said connector at center of said circular tubular groove, two pin holes formed through two opposite side walls of said connector in communication with an upper end portion of said cylindrical hole, a slideway formed in a side wall of said connector, an opening formed through a side wall of said connector in alignment with said locking holes of said rotating body, and a positioning hole formed through said side wall of said connector in communication with said slideway;

a sliding body including a slide plate secured thereto sliding in said slide slot in a direction parallel to said circular tube, a spring-biased locking element carried on said slide plate and engagable with one of said locking holes and said opening when said slide plate moves to a predetermined position, a horizontal sleeve secured to said sliding body, and two slide slots formed through said sliding body on two opposite sides of said connector, said locking element being normally engaged with said positioning hole, thereby allowing for relative rotation between said rotating body and said connector;

a sleeving secured to said stroller body and having a window formed in a wall thereof which is engaged with said retaining member so as to retain said insertion portion of said connector within said sleeving, said retaining member being capable of being pressed to disengage from said window;

a vertical pin extending, through said circular tube, into said cylindrical hole of said connector and having a pin hole formed transversely through an upper end portion thereof;

a horizontal pin extending through said slide slots of said sliding body, said pin holes of said connector and said pin hole of said vertical pin and having two diameter-increased heads formed on two ends thereof so as to retain said horizontal pin within said slide slots of said sliding body;

wherein each pair of aligned said front and rear caster units include a horizontal connecting rod inserted into both of said sleeves of said units at two ends thereof so as to move said sliding bodies synchronously.

* * * * *